United States Patent [19]

Perrier

[11] Patent Number: 4,497,466
[45] Date of Patent: Feb. 5, 1985

[54] SPRING SUPPORT DEVICE FOR PIPEWORK

[75] Inventor: Jean Perrier, Les Essarts-Leroi, France

[73] Assignee: Stein Industrie, Velizy-Villacoublay, France

[21] Appl. No.: 409,808

[22] Filed: Aug. 20, 1982

[30] Foreign Application Priority Data

Sep. 4, 1981 [FR] France .................. 81 16839

[51] Int. Cl.³ ............................................. F16M 13/00
[52] U.S. Cl. .................................... 248/588; 248/585
[58] Field of Search ............... 248/588, 585, 586, 584, 248/587, 589, 544, 49, 58, 65, 70

[56] References Cited

U.S. PATENT DOCUMENTS

| | | | |
|---|---|---|---|
| 920,135 | 5/1909 | Harrod | 248/584 |
| 2,850,203 | 9/1958 | Eurey | 248/584 |
| 2,867,399 | 1/1959 | Alexeff | 248/589 |
| 3,103,333 | 9/1963 | Suozzo | 248/58 |
| 3,118,643 | 1/1964 | Suozzo | 248/589 |
| 3,741,512 | 6/1973 | Olsson | 248/585 |
| 4,295,627 | 10/1981 | Graves | 248/588 |

FOREIGN PATENT DOCUMENTS 1485326 9/1977 United Kingdom .

Primary Examiner—William H. Schultz
Assistant Examiner—Ramon O. Ramirez
Attorney, Agent, or Firm—Sughrue, Mion, Zinn, Macpeak, and Seas

[57] ABSTRACT

A spring support device capable of large vertical displacement for supporting relatively light pipework, such as the purge pipes of a boiler in a power station. The device includes an articulated parallelogram linkage (6) comprising a first hinge (7) connected to a fixed point, a second hinge (8) connected to the load, and vertically opposite the first hinge, and two side hinges (9, 10) in the same horizontal plane. The two arms (11, 13) of the parallelogram linkage that pass through the first hinge have extensions (12, 14) projecting beyond the first hinge and bearing against a plate (3) which transmits force to a compression spring (2). The extensions (12, 14) are considerably shorter than the sides of the parallelogram linkage.

3 Claims, 4 Drawing Figures

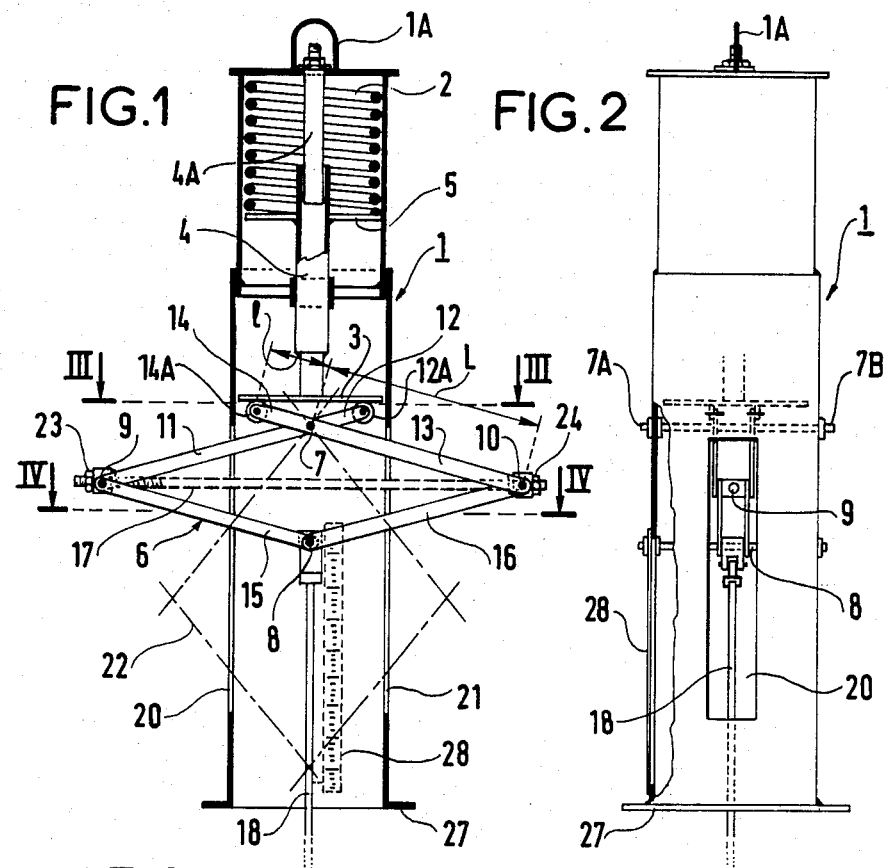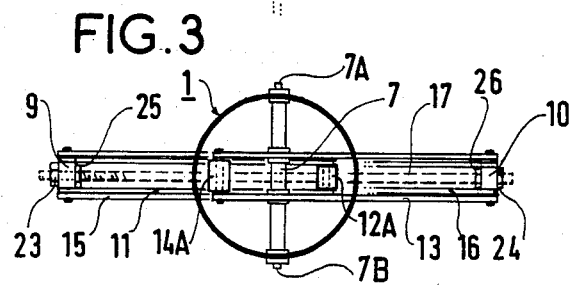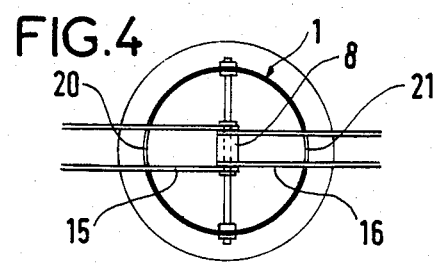

SPRING SUPPORT DEVICE FOR PIPEWORK

The present invention relates to a device for providing spring support capable of large vertical displacements for supporting pipework of relatively low mass per unit length, eg. as is the case for pipework applying a load of 15 to 50 daN on its supporting members, yet needing to be able to move 200 mm to 300 mm vertically. The purge pipes for the boiler in a power station provide an example of relatively lightweight pipework needing plenty of room for vertical movement.

BACKGROUND OF THE INVENTION

Pipework of this nature cannot be supported by the usual types of variable reaction spring support since they have too great variation in load between the compressed and the extended positions.

There are constant reaction springs available that enable a substantially constant load to be obtained regardless of their extension, but they are expensive, and in practice they are not made for such small loads. Counterweight systems are therefore used with a flail arm pivoting about a fixed point or with a cable and pulley arrangement. Such systems are not without their dangers, in that there is always the possibility that a counterweight will fall, and a flail type system occupies a lot of space.

Preferred embodiments of the present invention provide spring support devices which are subject to relatively small load variation between the compressed and the extended positions, which multiply the vertical displacement of the spring as seen by the pipework supported, and which make use of commercially available variable reaction spring support boxes.

SUMMARY OF THE INVENTION

The present invention provides a spring support device capable of large vertical displacement and for supporting relatively light pipework, wherein the device includes an articulated parallelogram linkage comprising upper arms and lower arms:

(a) a first hinge connected to a fixed point and joining said lower arms;

(b) a second hinge connected to the load, and vertically opposite the first hinge; and (c) two side hinges in the same horizontal plane joining ends of said upper and lower arms, the two arms of the parallelogram linkage that pass through the first hinge having extensions projecting beyond the first hinge and bearing against a plate which transmits force to a compression spring, the extensions being considerably shorter than the balance of the upper arms forming sides of the parallelogram linkage.

Preferably the first hinge is supported by a vertical cylindrical tube in which said plate is slidably mounted, said tube being provided with opposite longitudinally extending slots to allow the arms of the parallelogram linkage to project outside the tube.

The side hinges of the parallelogram linkage are preferably initially fitted on a horizontal rod having means for locking the hinges thereto to lock the parallelogram linkage, said horizontal rod being removed after installation of the device and/or after testing the installation as a whole.

BRIEF DESCRIPTION OF THE DRAWINGS

An embodiment of the invention is described by way of example with reference to the accompanying drawings, in which:

FIG. 1 is an axial section through a device in accordance with the invention;

FIG. 2 is a partially cut away side view of the device showing one of the side slots therein;

FIG. 3 is a section along a line III—III of FIG. 1; and

FIG. 4 is a section along a line IV—IV of FIG. 1.

MORE DETAILED DESCRIPTION

The device is housed in a housing 1 connected to a fixed point 1A. The housing contains a variable reaction compression spring 2 which is subjected to a force applied to it by a plate 3, as transmitted to a plate 5 by a moving rod 4 slidable on a fixed rod 4A.

An articulated parallelogram linkage 6 includes a top hinge 7, two side hinges 9 and 10, and a bottom hinge 8 which is connected to a load (not shown) by a vertical load bearing rod 18.

The upper arms of the parallelogram linkage have respective long portions 11 and 13 of length L, extending between the side hinges and the top hinge 7, and respective short portions 12 and 14 of length l projecting above the top hinge 7. The top ends of the short portions bear via rollers 12A and 14A against the lower plate 3 which controls the compression force applied to the spring. The lower arms 15 and 16 of the parallelogram linkage are naturally of the same length L as the long portions 11 and 13 of the upper arms. The side hinges 9 and 10 are movable along a horizontal rod 17 which is removed once the device is installed and the installation has been tested, if necessary. The displacement of a load connected to the lower hinge 8 for a given spring displacement is determined by the ratio L/l of the length of the parallelogram links divided by the length of the short extension portions, with the load moving 2L/l times as far as the spring. The load applied to the spring corresponds to the load of the pipework to be supported multiplied by the ratio L/l.

The multiplication potential of the device can be varied by replacing the articulated parallelogram linkage with a different parallelogram linkage having a different L/l ratio, or else by putting two or more parallelogram linkagess in series.

The housing 1 has elongate side openings or slots 20 and 21 leaving room for the linkage arms to move outside the housing. The parallelogram position for maximum permissible displacement is shown by dashed lines 22. A graduated scale 28 enables the displacement of the lower hinge to be followed.

By way of example, for a load of 50 daN and an expected load displacement of 200 mm, a spring box set at 150 daN can be used, providing for a vertical displacement of 33 mm, where the parallelogram linkage is one in which the ratio of the length of the parallelogram sides divided by the length of the short extensions is 3. Using a spring with stiffness of 1.12 daN/mm, the load on the pipework varies by $1.12 \times 33/3 = 12.5$ daN, ie. about one fourth of the total load.

The device may be locked either to isolate it during installation, or else to subject the pipework to hydraulic tests. For this purpose, the side hinges 9 and 10 are provided with nuts such as 23, 24, 25, and 26 for locking them to the rod 17.

The device may be hung from a structure by means of the part 1A, or else it may be placed on a structure by means of a flat flange 27, but it cannot be placed below the load.

I claim:

1. A spring support device capable of large vertical displacement and for supporting relatively light pipework, wherein the device includes an articulated parallelogram linkage comprising upper arms and lower arms;
   (a) a first hinge connected to a fixed point and joining said upper arms intermediate their ends;
   (b) a second hinge joining said lower arms and connected to a load, and vertically opposite the first hinge; and
   (c) two side hinges in the same horizontal plane joining ends of said upper and lower arms, the two upper arms of the parallelogram linkage that pass through the first hinge having extensions projecting beyond the first hinge, a plate overlying the extensions, the ends of said extensions slidably bearing against said plate, a compression spring positioned above said plate and means for transmitting said load force acting on said plate to said compression spring, the extensions being considerably shorter than the balance of the upper arms forming sides of the parallelogram linkage to provide a spring support device subjected to relatively small load variation between spring compressed and extend positions and which multiply the vertical displacements of the spring as seen by the pipework so supported.

2. A device according to claim 1, wherein the first hinge is supported by a vertical cylindrical tube in which said plate is slidably mounted, said tube being provided with opposite longitudinally extending slots to allow the arms of the parallelogram linkage to project outside the tube.

3. A device according to claim 1 or 2, further comprising a removable horizontal rod for initially fitting the side hinges of the parallelogram linkage on said horizontal rod and having means for locking the hinges thereto to lock the parallelogram linkage, said horizontal rod being removable after installation of the device and/or after testing the installation as a whole.

* * * * *